UNITED STATES PATENT OFFICE.

CORNELIUS D. VREELAND, OF CHICAGO HEIGHTS, ILLINOIS.

PIGMENT.

SPECIFICATION forming part of Letters Patent No. 691,421, dated January 21, 1902.

Application filed August 14, 1900. Serial No. 26,824. (No specimens.)

*To all whom it may concern:*

Be it known that I, CORNELIUS D. VREELAND, a citizen of the United States, residing at Chicago Heights, in the county of Cook and State of Illinois, have invented certain new and useful Improvements in the Production of Materials for the Manufacture of Paints; and I do hereby declare that the following is a full, clear, and exact description of the same.

This invention utilizes the sludge derived as a waste product from the manufacture of sulfate of alumina from bauxite; and it comprises a new and useful paint material and a novel and efficient process of making the same.

As will be seen by reference to works treating of the material from which alum is produced, (see, *e. g.*, *Mineral Industry of the United States*, New York and London, 1899, Vol. 7, page 13, *et seq.*,) commercial bauxite contains, besides the aluminium, oxid and hydrate of silica, varying between certain limits, and iron oxid. The acid should, of course, contain these with sulfuric acid.

In the production of sulfate of alumina (frequently termed in commerce "paper-makers' alum," "fitter alum," "concentrated alum," and "alum cake") from bauxite by the acid process the bauxite is reduced to a more or less broken or pulverized condition and is then treated with dilute sulfuric acid, the resultant solution containing sulfate of alumina, while other components of the bauxite are precipitated in the tank in which the bauxite is treated. The solution sulfate of alumina is then filtered, and there is deposited on the filter a further portion of material which in no essential degree differs from the precipitate just mentioned, which, like it, I term "sludge." This material from the filter may be added to the other sludge which is deposited by precipitation in the tank. The sludge, by reason of the treatment of the bauxite with sulfuric acid, as stated, is distinctly acid, and for the purposes of my invention this acid must be removed. This may be done by neutralizing the acid constituents of the sludge, as hereinafter set forth. For this purpose and also for a further purpose herein presently particularized I add to the sludge barium oxid in sufficient quantity to practically neutralize the acid constituents aforesaid, the barium oxid combining with the acid to produce a sulfate of barium, the presence of which is not only not injurious, but which is itself a valuable component of the product as a material for the manufacture of paint. In lieu of barium oxid barium carbonate may be used with a like result, the weak carbonic acid of the carbonate being replaced by the stronger acid in the sludge, thus neutralizing the acid constituents of the latter by a like production of barium sulfate. The proportion of barium oxid or of barium carbonate, as the case may be, to the quantity of sludge may vary within wide limits. It should be sufficient to chemically neutralize all or substantially all the acid constituents of the sludge. The preferred results are reached when the percentage of barium oxid or carbonate, as the case may be, is very little above that required to neutralize the acid components of the sludge, as hereinbefore set forth. The sludge being thus brought to a neutral condition is then dried by any suitable means and exists in a powdered or comminuted form, which may be brought to any desired uniformity of fineness by grinding or otherwise. The material thus prepared and composed of the dry neutral sludge, combined with the barium oxid, (to produce barium sulfate as a constituent in the resultant compound as described,) provides a superior material for the production of paints, being for that purpose ground in oil in the manner usual with other paint materials. The paint may receive various colors by the addition of a suitable pigment or pigments.

Dried neutral sludge produced in the manufacture of sulfate of alumina by the acid process being set forth and claimed in my application Serial No. 26,825, the same is not by itself claimed in this my present application; but What I here claim as my invention is—

1. As a new article of manufacture, a paint consisting of the sludge resulting from the production of sulfate of alumina from bauxite, dried and containing sulfate of barium in the intimate state of admixture produced by neutralizing the sulfuric acid of the sludge with oxid of barium, as set forth.

2. As a new article of manufacture a paint composed of sludge resulting from the production of sulfate of alumina from bauxite by the acid process, neutralized by oxid of barium, dried and reduced to a substantially uniform degree of fineness, and ground in oil, as set forth.

3. The process of producing a novel paint material which consists in neutralziing with barium oxid the acid sludge derived from the production of sulfate of alumina from bauxite by the acid process and drying the resultant product, as set forth.

CORNELIUS D. VREELAND.

Witnesses:
DANIEL S. DECKER,
JAMES A. WHITNEY.